US007130844B2

(12) United States Patent
Elder et al.

(10) Patent No.: US 7,130,844 B2
(45) Date of Patent: *Oct. 31, 2006

(54) SYSTEM AND METHOD FOR EXAMINING, CALCULATING THE AGE OF AN DOCUMENT COLLECTION AS A MEASURE OF TIME SINCE CREATION, VISUALIZING, IDENTIFYING SELECTIVELY REFERENCE THOSE DOCUMENT COLLECTIONS REPRESENTING CURRENT ACTIVITY

(75) Inventors: Michael D. Elder, Greer, SC (US); Jason Y. Jho, Raleigh, NC (US); Vaughn T. Rokosz, Newton, MA (US); Matthew Schultz, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 361 days.

This patent is subject to a terminal disclaimer.

(21) Appl. No.: 10/286,261

(22) Filed: Oct. 31, 2002

(65) Prior Publication Data

US 2004/0088287 A1  May 6, 2004

(51) Int. Cl.
*G06F 17/30* (2006.01)
*G06F 7/00* (2006.01)
*G06F 17/00* (2006.01)
*G06F 17/21* (2006.01)

(52) U.S. Cl. .................. 707/3; 707/104.1; 706/61; 715/500

(58) Field of Classification Search .............. 707/1–7, 707/10, 100–102, 104.1, 200–203, 205; 706/45–50, 706/61; 709/220–225; 345/440–441, 744; 715/501.1, 512–513, 500; 702/187; 725/9; 705/1–2, 26–27
See application file for complete search history.

(56) References Cited

U.S. PATENT DOCUMENTS 4,908,761 A    3/1990  Tai .......................... 364/401
5,371,673 A    12/1994 Fan ....................... 364/419.01
5,745,113 A    4/1998  Jordan et al. ............... 345/349
5,805,894 A *  9/1998  Robison ..................... 717/155
5,933,818 A    8/1999  Kasravi et al. ............... 706/12
5,999,968 A *  12/1999 Tsuda ......................... 709/213
6,006,223 A    12/1999 Agrawa et al. ................ 707/5
6,018,734 A    1/2000  Zhang et al. .................. 707/3
6,070,143 A    5/2000  Barney et al. ................. 705/8
6,115,718 A    9/2000  Huberman et al. .......... 707/102
6,138,128 A    10/2000 Perkowitz et al. .......... 707/501

(Continued)

FOREIGN PATENT DOCUMENTS

EP           1443425 A1 *  8/2004    ................ 17/30

(Continued)

OTHER PUBLICATIONS

John Cugini, "presenting search results: design, visualization, and evalluation", May 2002.html, 6 pages.*

(Continued)

*Primary Examiner*—Srirama Channavajjala
(74) *Attorney, Agent, or Firm*—IBM Corporation (57) ABSTRACT

System and method for evaluating an information aggregate. A metrics database stores document indicia including document attributes, associated persons and age of creation. A query engine responsive to a user request and the metrics database aggregates documents having same, unique attributes and calculates therefrom, or from meta data defining the aggregate, an age value of the aggregate. A visualization engine visualizes age values for a plurality of aggregates at a client display.

9 Claims, 6 Drawing Sheets

U.S. PATENT DOCUMENTS

| | | | | |
|---|---|---|---|---|
| 6,148,294 | A | 11/2000 | Beyda et al. | 707/1 |
| 6,167,410 | A * | 12/2000 | Imamura | 715/530 |
| 6,177,932 | B1 | 1/2001 | Galdes et al. | 345/733 |
| 6,182,067 | B1 | 1/2001 | Presnell et al. | 707/5 |
| 6,195,657 | B1 | 2/2001 | Rucker et al. | 707/5 |
| 6,199,067 | B1 | 3/2001 | Geller | 707/10 |
| 6,208,988 | B1 * | 3/2001 | Schultz | 707/5 |
| 6,212,494 | B1 | 4/2001 | Boguraev | 704/9 |
| 6,216,098 | B1 | 4/2001 | Clancy et al. | 703/6 |
| 6,233,583 | B1 | 5/2001 | Hoth | 707/102 |
| 6,249,779 | B1 | 6/2001 | Hitt | 706/1 |
| 6,266,649 | B1 | 7/2001 | Linden et al. | 705/26 |
| 6,275,820 | B1 | 8/2001 | Navin-Chandra et al. | 707/3 |
| 6,301,592 | B1 * | 10/2001 | Aoyama et al. | 715/511 |
| 6,334,127 | B1 | 12/2001 | Bieganski et al. | 707/5 |
| 6,339,767 | B1 * | 1/2002 | Rivette et al. | 707/2 |
| 6,363,174 | B1 | 3/2002 | Lu | 382/209 |
| 6,438,537 | B1 * | 8/2002 | Netz et al. | 707/3 |
| 6,529,900 | B1 * | 3/2003 | Patterson et al. | 707/3 |
| 6,643,633 | B1 * | 11/2003 | Chau et al. | 707/1 |
| 6,681,227 | B1 * | 1/2004 | Kojima et al. | 707/10 |
| 6,732,090 | B1 * | 5/2004 | Shanahan et al. | 707/3 |
| 2001/0017707 | A1 * | 8/2001 | Lee | 358/1.12 |
| 2002/0019827 | A1 * | 2/2002 | Shiman et al. | 707/200 |
| 2002/0035593 | A1 | 3/2002 | Salim et al. | 709/202 |
| 2002/0049792 | A1 * | 4/2002 | Wilcox et al. | 707/522 |
| 2002/0069037 | A1 * | 6/2002 | Hendrickson et al. | 702/186 |
| 2002/0072997 | A1 * | 6/2002 | Colson et al. | 705/27 |
| 2002/0080387 | A1 * | 6/2002 | Grasso et al. | 358/1.15 |
| 2002/0116466 | A1 * | 8/2002 | Trevithick et al. | 709/206 |
| 2002/0169746 | A1 * | 11/2002 | Cowman et al. | 707/1 |
| 2003/0018634 | A1 * | 1/2003 | Shringeri et al. | 707/4 |
| 2003/0074350 | A1 * | 4/2003 | Tsuda | 707/3 |
| 2003/0117434 | A1 * | 6/2003 | Hugh | 345/744 |
| 2003/0120654 | A1 * | 6/2003 | Edlund et al. | 707/7 |
| 2003/0126136 | A1 * | 7/2003 | Omoigui | 707/10 |
| 2003/0135606 | A1 * | 7/2003 | Goodwin et al. | 709/224 |
| 2003/0182310 | A1 * | 9/2003 | Charnock et al. | 707/104.1 |
| 2004/0049571 | A1 * | 3/2004 | Johnson et al. | 709/224 |
| 2004/0059705 | A1 * | 3/2004 | Wittke et al. | 707/1 |
| 2004/0088276 | A1 * | 5/2004 | Elder et al. | 707/1 |
| 2004/0183799 | A1 * | 9/2004 | Hao et al. | 345/440 |
| 2004/0249871 | A1 * | 12/2004 | Bazoon | 707/206 |
| 2005/0071741 | A1 * | 3/2005 | Acharya et al. | 715/500 |

FOREIGN PATENT DOCUMENTS

| | | | | |
|---|---|---|---|---|
| EP | 1443427 A1 * | 8/2004 | | 17/30 |
| JP | 2001119403 A | 4/2001 | | |
| WO | WO 98/44430 | * | 10/1998 | 17/30 |
| WO | WO 99/18525 | * | 4/1999 | 17/30 |
| WO | WO 0137162 A2 | 5/2001 | | |
| WO | WO0201455 A2 | 2/2002 | | |
| WO | WO 02/31697 | * | 4/2002 | 17/30 |
| WO | WO 03/073323 A1 * | 9/2003 | | 17/30 |
| WO | WO 2004/057438 | * | 7/2004 | |
| WO | WO 2004/070627 | * | 8/2004 | 17/30 |

OTHER PUBLICATIONS

Petri Myllymaki et al. Massively parallel case-based reasoning with probabilistic similarity metrics, vol. 837, lecture notes in aritfical intellegence, spring, 1994pp. 144-154.*

Betty Salzberg, et al. "indexing for aggregation", 1996, pp. 1-7.*

Brath,R, "metrics for effective information visualization", information visualization, 1997 proceeedings, IEEE symposium, Oct. 1997, pp. 108-111.*

Xiaolan Zhu et al. "incorporating quality metrics in centralized/ distributed information retrieval on the world wide web", proceedings of the 23rd annual international ACM SIGIR conference on researhc and development in information retrieval, 2000, pp.288.*

Aibing Rao et al. "A method for measuring the complexity of image databases", IEEE transactions on multimedia vol. 4, No. 2, Jun. 2002, pp. 160-170.*

Frederic Vernier et al. "visualization techniques for circular tabletop interfaces", Mitsubishi electric research laboratories, TR2002-01, appeared in advanced visual interfaces, May 2002.*

NORA annual report for the period Oct. 2004 through Oct. 2005, no date.*

Goldman-Segall,R et al. "a collaborative on-line digital data tool for creating livingnarratives in organizational knowledge systems", proceedings of the thirty-first Hawaii conference on system sciences, 1998, vol. 1, pp. 194-199.*

Andrews,K, "visualizing rich, structured hypermedia", IEEE computer graphics and applications, vol. 18, issue: 4, 1998, pp. 40-42.*

Brouillette, S. M. and J. P. Lavelle. *A Methodology for Mapping and Analyzing Community Social Services as a System*.Norcross, 6th Industrial Engineering Research Conference Proceedings. Miami Beach, May 17-18, 1997. Institute of Industrial Engineers, Norcross, GA, 1997. 662-667.

Sack, W. *Diagrams of Social Cohesion*. Association for Computational Linguistics, U of Maryland. MIT Media Laboratory, Jun. 1999. 3 plus 8 pages.

Kautz, H., B. Selman, M. Shah.. *Referral Web: Combining Social Networks and Collaborative Filtering*. Communications of the ACM, vol. 40, No. 3, Mar. 1997.

Schwartz, M. F., D. C. M. Wood. *Discovering shared interests using graph analysis*. Communications of the ACM, v. 36 n. 8 Aug. 1993. 78-89.

Wellman, B. *For a social network analysis of computer networks: a socialogical perspective on collaborative work and virtual community*. Proceedings of the 1996 conference on ACM SIGCPR/SIGMIS. 1-11.

Qureshi, S. *Supporting electronic groupprocesses: a social perspective*. Proceedings of the 1995 ACM SIGCPR Conference on Supporting teams, groups, and learning inside the IS function. ACM Press. 24-34.

Ackerman, M.S., B. Starr. *Social activity indicators: interface components for CSCW systems*. Proceedings of the 8th ACM Symposium on User Interface and Software Technology. ACM Press. 159-168.

Garton, L., C. Haythornthwaite, B. Wellman. *Studying on-line social networks* in Doing Internet Research, edited by Steve Jones, Thousand Oaks, CA: Sage, 1999, Chapter-4 pp. 75-105.

Srivastava, Jaidepp, Robert Cooley, Mukund Deshpande, Pang-Ning Tan. *Web Usage Mining: Discovery and Applications of Usage Patterns from Web Data*. SIGKDD Explorations, vol. 1, Issue 2. Jan. 2000. 12-23.

Wang, Y. *Web Mining and Knowledge Discovery of Usage Patterns*. CS748T Project (Part 1) Feb. 2000, 25 pages.

Sack, W. *Conversation Map: a content-based Usenet newsgroup browser*. Proceedings of the 2000 International Conference on Intelligent User Interfaces. ACM Press. 223-240.

Kaugers, K. *Integrated multi scale text retrieval visualization*. Conference on Human Factors and Computing Systems, Proceeedings o fthe Conference on CHI 98 Summary: Human Factors in Computing Systems, ISBN: 1-58113-028-7 ACM Digital Library, 1998. 307-308.

Feldman, R. *Mining unstructured data*. Tutorial notes for ACK SIGKDD 1999. ACM Press. 182-236.

U.S. Appl. No. 10/286,211, filed Oct. 31, 2002, for "System and Method for Determining Founders of an Information Aggregate".

U.S. Appl. No. 10,044,914, filed Jan. 15, 2002 for System and Method for Implementing a Metrics Engine for Tracking Relationships Over Time.

* cited by examiner

FIG. 1

XML FORMAT FOR SQL QUERIES

FIG. 4

QRML STRUCTURE

SYSTEM AND METHOD FOR EXAMINING, CALCULATING THE AGE OF AN DOCUMENT COLLECTION AS A MEASURE OF TIME SINCE CREATION, VISUALIZING, IDENTIFYING SELECTIVELY REFERENCE THOSE DOCUMENT COLLECTIONS REPRESENTING CURRENT ACTIVITY

BACKGROUND OF THE INVENTION

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 10/286,211 is now pending filed 31 Oct. 2002 for "SYSTEM AND METHOD FOR DETERMINING FOUNDERS OF AN INFORMATION AGGREGATE";

Ser. No. 10/286,263 is now pending, filed 31 Oct. 2002 for "SYSTEM AND METHOD FOR FINDING THE ACCELERATION OF AN INFORMATION AGGREGATE";

Ser. No. 10/286,262 is now pending, filed 31 Oct. 2002 for "SYSTEM AND METHOD FOR FINDING THE RECENCY OF AN INFORMATION AGGREGATE";

Ser. No. 10/286,212 is now pending, filed 31 Oct. 2002 for "SYSTEM AND METHOD FOR DETERMINING CONNECTIONS BETWEEN INFORMATION AGGREGATES", Ser. No. 10/286,237 is now pending, filed 31 Oct. 2002 for "SYSTEM AND METHOD FOR DETERMINING MEMBERSHIP OF INFORMATION AGGREGATES";

Ser. No. 10/286,508 is now U.S. Pat. No. 7,065,532, filed 31 Oct. 2002 for "SYSTEM AND METHOD FOR EVALUATING INFORMATION AGGREGATES BY VISUALIZING ASSOCIATED CATEGORIES";

Ser. No. 10/286,145 is now pending, filed 31 Oct. 2002 for "SYSTEM AND METHOD FOR DETERMINING COMMUNITY OVERLAP";

Ser. No. 10/285,799 is now pending, filed 31 Oct. 2002 for "SYSTEM AND METHOD FOR BUILDING SOCIAL NETWORKS BASED ON ACTIVITY AROUND SHARED VIRTUAL OBJECTS"; and Ser. No. 10/286,534 is now pending, filed 31 Oct. 2002 for "SYSTEM AND METHOD FOR ANALYZING USAGE PATTERNS IN INFORMATION AGGREGATES".

TECHNICAL FIELD OF THE INVENTION

This invention relates to a method and system for analyzing trends in an information aggregate. More particularly, it relates to identifying and visualizing aging of collections of aggregates.

BACKGROUND ART

Corporations are flooded with information. The Web is a huge and sometimes confusing source of external information which only adds to the body of information generated internally by a corporation's collaborative infrastructure (e-Mail, Notes databases, QuickPlaces, and so on). With so much information available, it is difficult to determine what's important and what's worth looking at.

There are systems that attempt to identify important documents, but these systems are focused on individual documents and not on aggregates of documents. For example, search engines look for documents based on specified keywords, and rank the results based on how well the keywords match the target documents. Each individual document is ranked, but collections of documents are not analyzed and visualized.

Systems that support collaborative filtering provide a way to assign a value to documents based on user activity, and can then find similar documents. For example, Amazon.com can suggest books to a patron by looking at the books he has purchased in the past. Purchases can be ranked by the patron to help the system determine the value of those books, and Amazon can then find similar books (based on the purchasing patterns of other people).

The Lotus Discovery Server (LDS) is a Knowledge Management (KM) tool that allows users to more rapidly locate the people and information they need to answer their questions. It categorizes information from many different sources (referred to generally as knowledge repositories) and provides a coherent entry point for a user seeking information. Moreover, as users interact with LDS and the knowledge repositories that it manages, LDS can learn what the users of the system consider important by observing how users interact with knowledge resources. Thus, it becomes easier for users to quickly locate relevant information.

There is a need, however, to determine which helpful visualizations can be derived from what LDS learns from tracking the users. In particular, there is a need to (1) identify trends in knowledge over time, (2) identify the social networks that form from users' interaction around a shared aggregate resource, (3) identify those visualizations that allow inferences about how successfully the system is adopted and utilized by users, and (4) identify those visualizations which could help or encourage a higher level of adoption.

The focus of LDS is to provide specific knowledge or answers to localized inquiries; focusing users on the documents, categories, and people who can answer their questions. There is a need, however, to magnify existing trends within the system—thus focusing on the system as a whole instead of specific knowledge.

It is an object of the invention to provide an improved system and method for detecting and visualizing knowledge trends within a knowledge repository.

SUMMARY OF THE INVENTION

A system and method for evaluating information aggregates by collecting a plurality of documents having non-unique values on a shared attribute into an information aggregate; time stamping each document with its date of creation; calculating age of each of a plurality of information aggregates; and visualizing the ages of a plurality of information aggregates.

In accordance with an aspect of the invention, there is provided a computer program product configured to be operable for evaluating information aggregates by collecting a plurality of documents having non-unique values on a shared attribute into an information aggregate; time stamping each document with its date of creation; calculating age of each of a plurality of information aggregates; and visualizing the ages of a plurality of information aggregates.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

In accordance with the preferred embodiment of the invention, an aging metric is provided for evaluating information aggregates. In an exemplary embodiment of the invention, the aging metric may be implemented in the context of the Lotus Discovery Server (a product sold by IBM Corporation).

The Discovery Server tracks activity metrics for the documents that it organizes, including when a document is created, modified, responded to, or linked to. This allows the calculation of category aging and visualization of these aging values for all categories in, for example, a bar chart.

The Lotus Discovery Server (LDS) is a Knowledge Management (KM) tool that allows users to more rapidly locate the people and information they need to answer their questions. In an exemplary embodiment of the present invention, the functionality of the Lotus Discovery Server (LDS) is extended to include useful visualizations that magnify existing trends of an aggregate system. Useful visualizations of knowledge metric data store by LDS are determined, extracted, and visualized for a user.

On its lowest level, LDS manages knowledge resources. A knowledge resources is any form of document that contains knowledge or information. Examples include Lotus WordPro Documents, Microsoft Word Documents, webpages, postings to newsgroups, etc. Knowledge resources are typically stored within knowledge repositories—such as Domino.Doc databases, websites, newsgroups, etc.

When LDS is first installed, an Automated Taxonomy Generator (ATG) subcomponent builds a hierarchy of the knowledge resources stored in the knowledge repositories specified by the user. For instance, a document about working with XML documents in the Java programming language stored in a Domino.Doc database might be grouped into a category named 'Home>Development>Java>XML'. This categorization will not move or modify the document, just record its location in the hierarchy. The hierarchy can be manually adjusted and tweaked as needed once initially created.

A category is a collection of knowledge resources and other subcategories of similar content, generically referred to as documents, that are concerned with the same topic. A category may be organized hierarchically. Categories represent a more abstract re-organization of the contents of physical repositories, without displacing the available knowledge resources. For instance, in the following hierarchy:

Home (Root of the hierarchy)
Animals
   Dogs
   Cats
Industry News and Analysis
   CNN
   ABC News
   MSNBC 'Home>Animals', 'Home>Industry News and Analysis', and 'Home>Industry News and Analysis>CNN' are each categories that can contain knowledge resources and other subcategories. Furthermore, 'Home>Industry News and Analysis>CNN' might contain documents from www.cnn.com and documents created by users about CNN articles which are themselves stored in a Domino.Doc database.

A community is a collection of documents that are of interest to a particular group of people collected in an information repository. The Lotus Discovery Server (LDS) allows a community to be defined based on the information repositories used by the community. Communities are defined by administrative users of the system (unlike categories which can be created by LDS and then modified). If a user interacts with one of the repositories used to define Community A, then he is considered an active participant in that community. Thus, communities represent the physical storage of knowledge resources and provide a mechanism for LDS to observe the activity of a group of people.

Another capability of LDS is its search functionality. Instead of returning only the knowledge resources (documents) that a standard web-based search engine might locate, LDS also returns the categories that the topic might be found within and the people that are most knowledge about that topic.

The system and method of the preferred embodiments of the invention are built on a framework that collectively integrates data-mining, user-interface, visualization, and server-side technologies. An extensible architecture provides a layered process of transforming data sources into a state that can be interpreted and outputted by visualization components. This architecture is implemented through Java, Servlets, JSP, SQL, XML, and XSLT technology, and essentially adheres to a model-view controller paradigm, where interface and implementation components are separated. This allows effective data management and server side matters such as connection pooling to be independent In accordance with the preferred embodiment of the invention, information visualization techniques are implemented through the three main elements including bar charts, pie charts, and tables. Given the simplicity of the visualization types themselves, the context in which they are contained and rendered is what makes them powerful mediums to reveal and magnify hidden knowledge dynamics within an organization.

Figure 1:
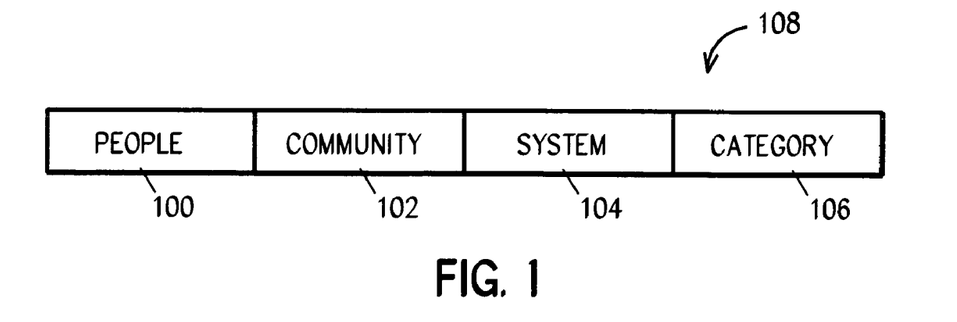
FIG. 1 is a diagrammatic representation of visualization portfolio strategically partitioned into four distinct domains in accordance with the preferred embodiment of the invention.

Referring to FIG. 1, a visualization portfolio is strategically partitioned into four distinct domains, or explorers: people 100, community 102, system 104, and category 106. The purpose of these partitioned explorers 100–106 is to provide meaningful context for the visualizations. The raw usage pattern metrics produced from the Lotus Discovery Server (LDS) do not raise any significant value unless there is an applied context to it. In order to shed light on the hidden relationships behind the process of knowledge creation and maintenance, there is a need to ask many important questions. Who are the knowledge creators? Who are the ones receiving knowledge? What group of people are targeted as field experts? How are groups communicating with each other? Which categories of information are thriving or lacking activity? How is knowledge transforming through time? While answering many of these questions, four key targeted domains, or explorer types 100–106 are identified, and form the navigational strategy for user interface 108. This way, users can infer meaningful knowledge trends and dynamics that are context specific.

People Domain 100

People explorer 100 focuses on social networking, community connection analysis, category leaders, and affinity analysis. The primary visualization component is table listings and associations.

Community Domain 102

Community explorer 102 focuses on acceleration, associations, affinity analysis, and document analysis for communities. The primary visualization components are bar charts and table listings. Features include drill down options to view associated categories, top documents, and top contributors.

One of the most interesting of the community visualizations is how fast the community is growing. This allows a user to instantly determine which communities are growing and which communities are stabilizing. A stabilizing community is one in which the user base has not grown much recently. That does not mean necessarily that the community is not highly active, it simply means that there have not been many additions in the user base. Communities that grow quickly could indicate new teams that are forming, and also denote spurts in the interests of the user base in a new topic (perhaps sales of a new product or a new programming language).

The document activity over time metric allows a more fine-grained measure of community activity. LDS maintains a record of the activity around documents. This means that if a user authors a document, links to a document, accesses a document, etc., LDS remembers this action and later uses this to calculate affinities. However, by analyzing these metrics relative to the available communities, an idea of the aggregate activity of a community in relation to the individual metrics may be derived. That is, by summing all of the 'author' metrics for communities A, B, C, etc, and doing this for all possible metrics, yields a quick visualization of the total document activity over time, grouped by community.

System Domain 104

System explorer 104 focuses on high level activity views such as authors, searches, accesses, opens, and responses for documents. The primary visualization components are bar charts (grouped and stacked). Features include zooming and scrollable regions.

Category Domain 106

Category explorer 106 focuses on lifespan, recency, acceleration, affinity analysis, and document analysis of categories generated by a Lotus Discovery Server's Automated Taxonomy Generator. The primary visualization components are bar charts. Features include drill down options to view subcategories, top documents, top contributors, category founders, and document activity.

System Overview

Figure 2:
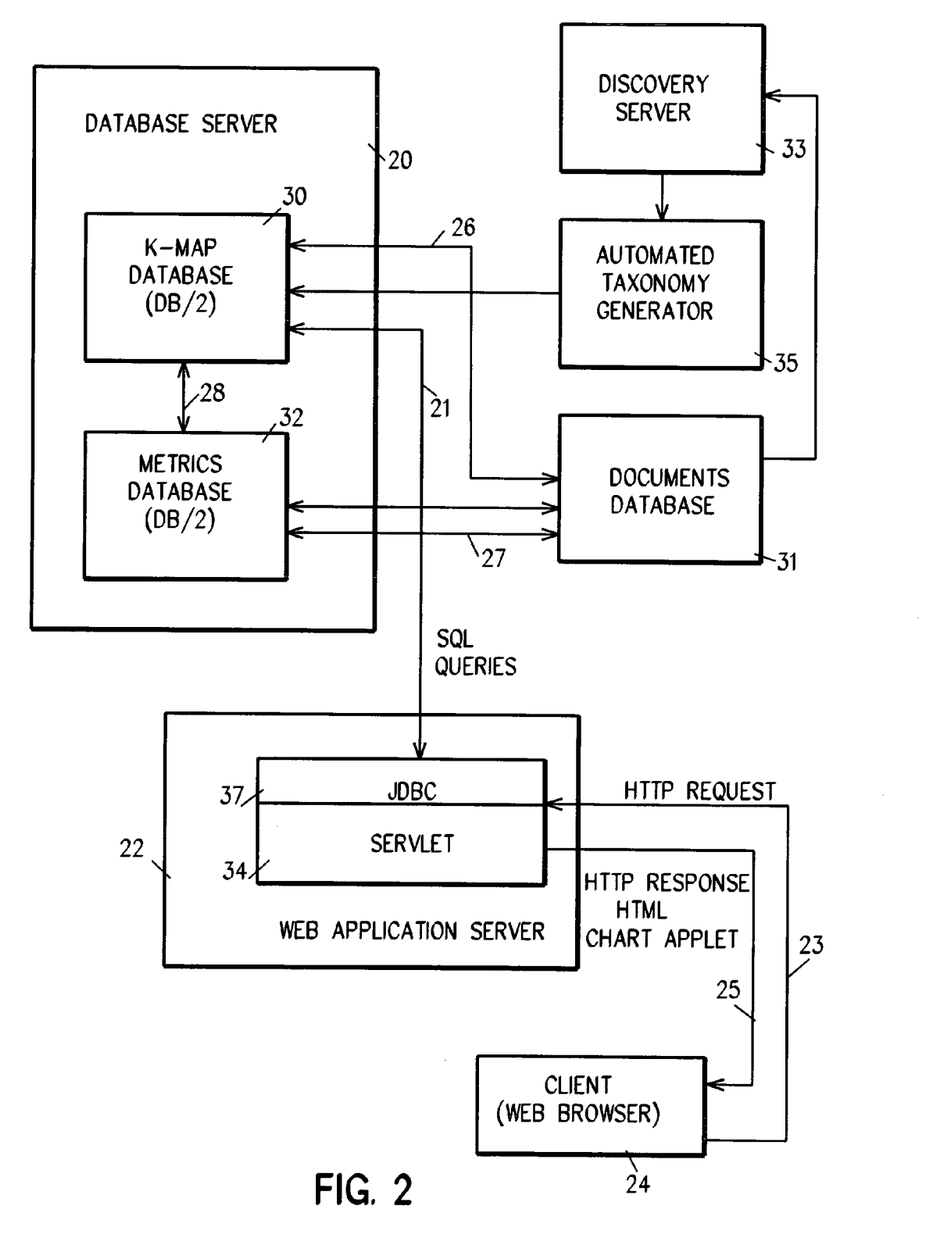
FIG. 2 is a system diagram illustrating a client/server system in accordance with the preferred embodiment of the invention.

Referring to FIG. 2, an exemplary client/server system is illustrated, including database server 20, discovery server 33, automated taxonomy generator 35, web application server 22, and client browser 24.

Knowledge management is defined as a discipline to systematically leverage information and expertise to improve organizational responsiveness, innovation, competency, and efficiency. Discovery server 33 (e.g. Lotus Discovery Server) is a knowledge system which may deployed across one or more servers. Discovery server 33 integrates code from several sources (e.g., Domino, DB2, InXight, KeyView and Sametime) to collect, analyze and identify relationships between documents, people, and topics across an organization. Discovery server 33 may store this information in a data store 31 and may present the information for browse/query through a web interface referred to as a knowledge map (e.g., K-map) 30. Discovery server 33 regularly updates knowledge map 30 by tracking data content, user expertise, and user activity which it gathers from various sources (e.g. Lotus Notes databases, web sites, file systems, etc.) using spiders.

Database server 20 includes knowledge map database 30 for storing a hierarchy or directory structure which is generated by automated taxonomy generator 35, and metrics database 32 for storing a collection of attributes of documents stored in documents database 31 which are useful for forming visualizations of information aggregates. The k-map database 30, the documents database 31, and the metrics database are directly linked by a key structure represented by lines 26, 27 and 28. A taxonomy is a generic term used to describe a classification scheme, or a way to organize and present information, Knowledge map 30 is a taxonomy, which is a hierarchical representation of content organized by a suitable builder process (e.g., generator 35).

A spider is a process used by discovery server 33 to extract information from data repositories. A data repository (e.g. database 31) is defined as any source of information that can be spidered by a discovery server 33.

Java Database Connectivity API (JDBC) 37 is used by servlet 34 to issue Structured Query Language (SQL) queries against databases 30, 31, 32 to extract data that is relevant to a users request 23 as specified in a request parameter which is used to filter data. Documents database 31 is a storage of documents in, for example, a Domino database or DB2 relational database.

The automated taxonomy generator (ATG) 35 is a program that implements an expectation maximization algorithm to construct a hierarchy of documents in knowledge map (K-map) metrics database 32, and receives SQL queries on link 21 from web application server 22, which includes servlet 34. Servlet 34 receives HTTP requests on line 23 from client 24, queries database server 20 on line 21, and provides HTTP responses, HTML and chart applets back to client 24 on line 25.

Discovery server 33, database server 20 and related components are further described in U.S. patent application Ser. No. 10,044,914 is now pending filed 15 Jan. 2002 for System and Method for Implementing a Metrics Engine for Tracking Relationships Over Time.

Figure 3:
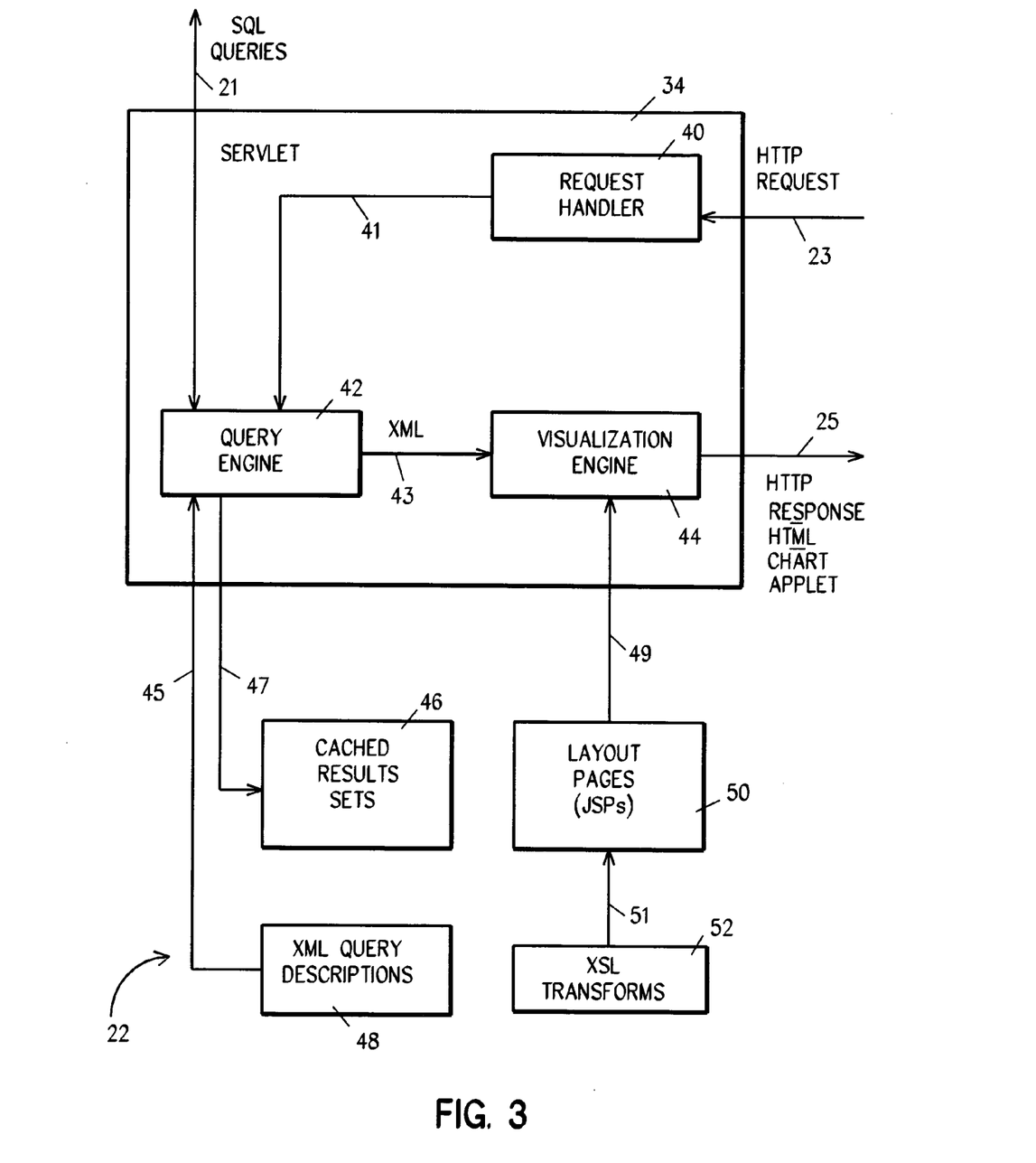
FIG. 3 is a system diagram further describing the web application server of FIG. 2.

Referring to FIG. 3, web application server 22 is further described. Servlet 34 includes request handler 40 for receiving HTTP requests on line 23, query engine 42 for generating SQL queries on line 21 to database server 20 and result set XML responses on line 43 to visualization engine 44. Visualization engine 44, selectively responsive to XML 43 and layout pages (JSPs) 50 on line 49, provides on line 25 HTTP responses, HTML, and chart applets back to client 24. Query engine 42 receives XML query descriptions 48 on line 45 and caches and accesses results sets 46 via line 47. Layout pages 50 reference XSL transforms 52 over line 51.

In accordance with the preferred embodiment of the invention, visualizations are constructed from data sources 32 that contain the metrics produced by a Lotus Discovery Server. The data source 32, which may-be stored in an IBM DB2 database, is extracted through tightly coupled Java and XML processing.

Figure 4:
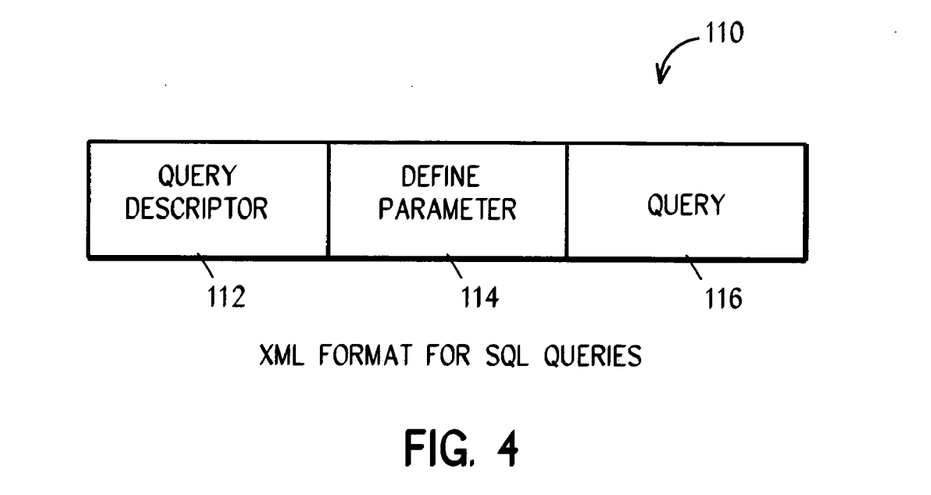
FIG. 4 is a diagrammatic representation of the XML format for wrapping SQL queries.

Referring to FIG. 4, the SQL queries 21 that are responsible for extraction and data-mining are wrapped in a result set XML format having a schema (or structure) 110 that provides three main tag elements defining how the SQL queries are executed. These tag elements are <queryDescriptor> 112, <defineParameter> 114, and <query> 116.

The <queryDescriptor> element 112 represents the root of the XML document and provides an alias attribute to describe the context of the query. This <queryDescriptor> element 112 is derived from http request 23 by request handler 40 and fed to query engine 42 as is represented by line 41.

The <defineparameter> element 114 defines the necessary parameters needed to construct dynamic SQL queries 21 to perform conditional logic on metrics database 32. The parameters are set through its attributes (localname, requestParameter, and defaultValue). The actual parameter to be looked up is requestParameter. The localname represents the local alias that refers to the value of requestParameter. The defaultValue is the default parameter value.

QRML structure 116 includes <query> element 116 containing the query definition. There can be one or more <query> elements 116 depending on the need for multiple query executions. A <data> child node element is used to wrap the actual query through its corresponding child nodes. The three essential child nodes of <data> are <queryComponent>, <useParameter>, and <queryAsFullyQualified>. The <queryComponent> element wraps the main segment of the SQL query. The <useParameter> element allows parameters to be plugged into the query as described in <defineParameter>. The <queryAsFullyQualified> element is used in the case where the SQL query 21 needs to return an unfiltered set of data.

When a user at client browser 24 selects a metric to visualize, the name of an XML document is passed as a parameter in HTTP request 23 to servlet 34 as follows:
<input type=hidden name="queryAlias" value="AffinityPerCategory">

In some cases, there is a need to utilize another method for extracting data from the data source 32 through the use of a generator Java bean. The name of this generator bean is passed as a-parameter in HTTP request 23 to servlet 34 as follows:
<input type=hidden name="queryAlias" value="PeopleInCommonByCommGenerator">

Once servlet 34 receives the XML document name or the appropriate generator bean reference at request handler 40, query engine 42 filters, processes, and executes query 21. Once query 21 is executed, data returned from metrics database 32 on line 21 is normalized by query engine 42 into an XML format 43 that can be intelligently processed by an XSL stylesheet 52 further on in the process.

Figure 5:
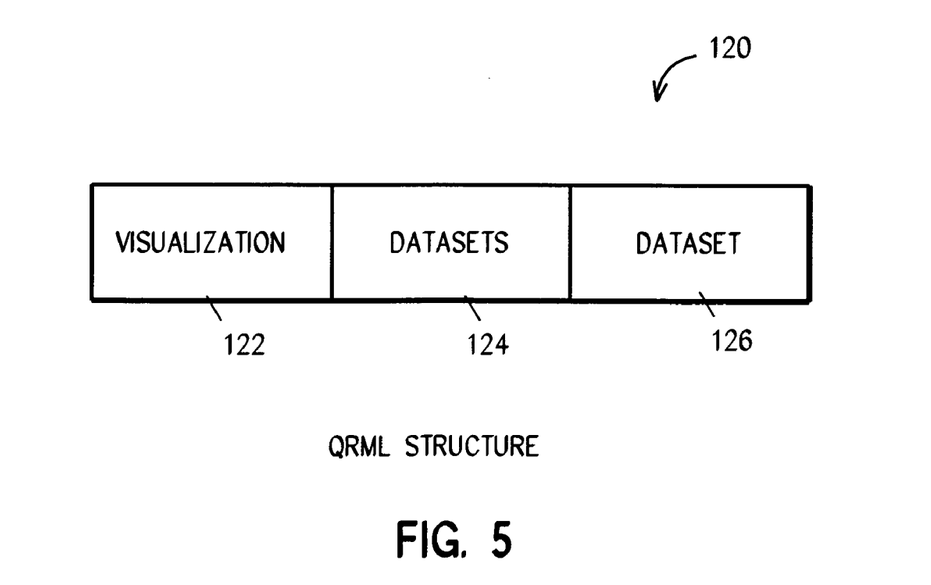
FIG. 5 is a diagrammatic representation of a normalized XML format, or QRML.

Referring to FIG. 5, the response back to web application server 22 placed on line 21 is classified as a Query Response Markup Language (QRML) 120. QRML 120 is composed of three main elements. They are <visualization> 122, <datasets> 124, and <dataset> 126. QRML structure 120 describes XML query descriptions 48 and the construction of a result set XML on line 43.

The <visualization> element 122 represents the root of the XML document 43 and provides an alias attribute to describe the tool used for visualization, such as a chart applet, for response 25.

The <datasets> element 124 wraps one or more <dataset> collections depending on whether multiple query executions are used.

The <dataset> element 126 is composed of a child node <member> that contains an attribute to index each row of returned data. To wrap the raw data itself, the <member> element has a child node <elem> to correspond to column data.

Data Translation and Visualization

Referring further to FIG. 3, for data translation and visualization, in accordance with the architecture of an exemplary embodiment of the invention, an effective delineation between the visual components (interface) and the data extraction layers (implementation) is provided by visualization engine 44 receiving notification from query engine 42 and commanding how the user interface response on line 25 should be constructed or appear. In order to glue the interface to the implementation, embedded JSP scripting logic 50 is used to generate the visualizations on the client side 25. This process is two-fold. Once servlet 34 extracts and normalizes the data source 32 into the appropriate XML structure 43, the resulting document node is then dispatched to the receiving JSP 50. Essentially, all of the data packaging is performed before it reaches the client side 25 for visualization. The page is selected by the value parameter of a user HTTP request, which is an identifier for the appropriate JSP file 50. Layout pages 50 receive the result set XML 120 on line 43, and once received an XSL transform takes effect that executes a transformation to produce parameters necessary to launch the visualization.

For a visualization to occur at client 24, a specific set of parameters needs to be passed to the chart applet provided by, for example, Visual Mining's Netcharts solution. XSL transformation 52 generates the necessary Chart Definition Language (CDLs) parameters, a format used to specify data parameters and chart properties. Other visualizations may involve only HTML (for example, as when a table of information is displayed).

An XSL stylesheet (or transform) 52 is used to translate the QRML document on line 43 into the specific CDL format shown above on line 25.

This process of data retrieval, binding, and translation all occur within a JSP page 50. An XSLTBean opens an XSL file 52 and applies it to the XML 43 that represents the results of the SQL query. (This XML is retrieved by calling queryResp.getDocumentElement( )). The final result of executing this JSP 50 is that a HTML page 25 is sent to browser 24. This HTML page will include, if necessary, a tag that runs a charting applet (and provides that applet with the parameters and data it needs to display correctly). In simple cases, the HTML page includes only HTML tags (for example, as in the case where a simple table is displayed at browser 24). This use of XSL and XML within a JSP is a well-known Java development practice.

In Ser. No. 10/286,211 is now pending filed 31 Oct. 2002 for "SYSTEM AND METHOD FOR DETERNINING FOUNDERS OF AN INFORMATION AGGREGATE" Table 1 illustrates an example of XML structure 110; Table 2 illustrates an example of the normalized XML, or QRML, structure; Table 3 illustrates an example of CDL defined parameters fed to client 24 on line 25 from visualization engine 44; Table 4 illustrates an example of how an XSL stylesheet 52 defines translation; and Table 5 is script illustrating how pre-packaged document node 43 is retrieved and how an XSL transformation 52 is called to generate the visualization parameters.

An exemplary embodiment of the system and method of the invention may be built using the Java programming language on the Jakarta Tomcat platform (v3.2.3) using the Model-View-Controller (MVC) (also known as Model 2) architecture to disjoin the data model from the view mechanism.

An exemplary embodiment of the system and method of the invention may be built using the Java programming language on the Jakarta Tomcat platform (v3.2.3) using the Model-View-Controller (MVC) (also known as Model 2) architecture to separate the data model from the view mechanism.

Information Aggregate

Figure 6:
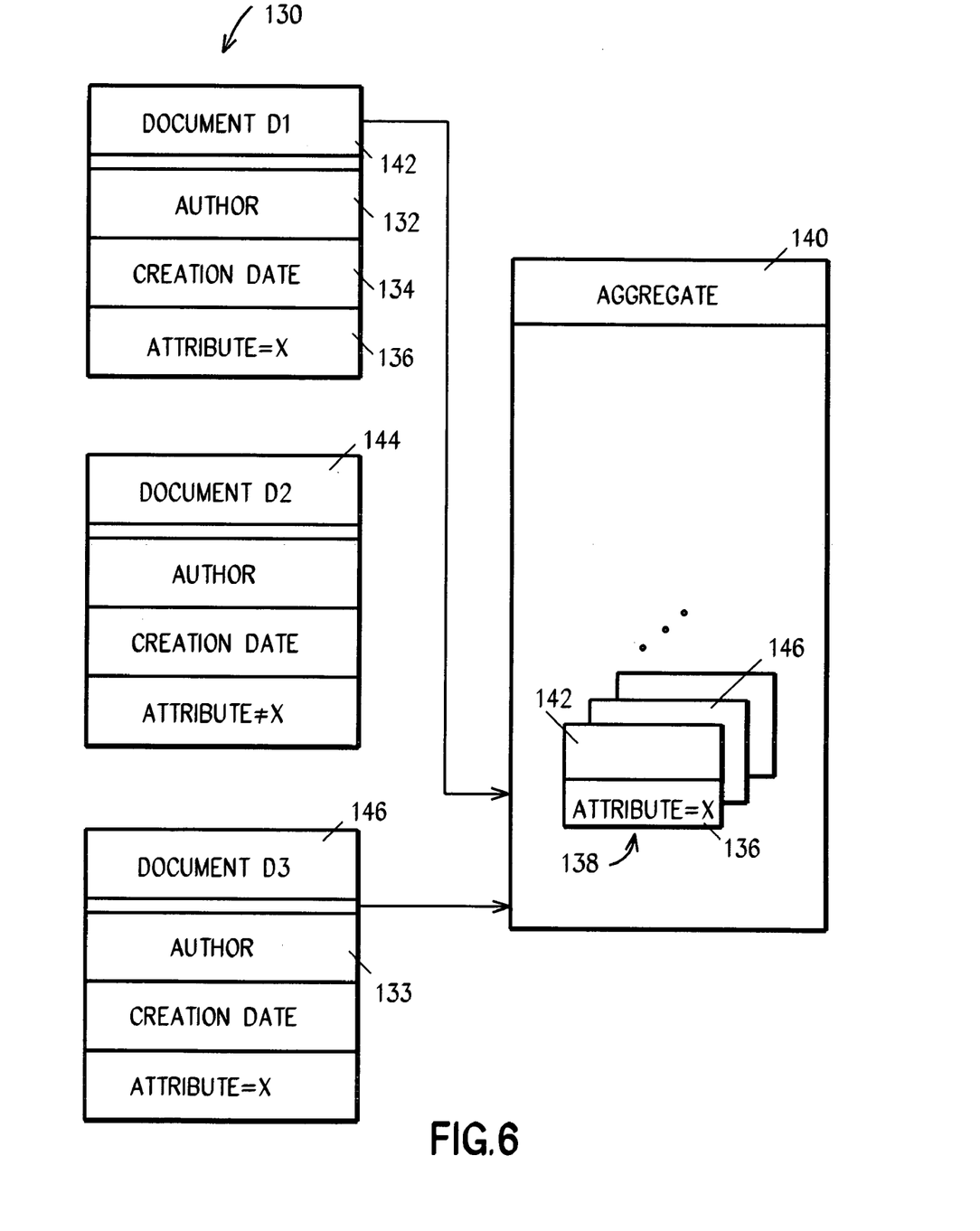
FIG. 6 is a diagrammatic representation of an aggregate in accordance with the preferred embodiment of the invention.

Referring to FIG. 6, a system in accordance with the present invention contains documents 130 such as Web pages, records in Notes databases, and e-mails. Each document 130 is associated with its author 132, and the date of its creation 134. A collection of selected documents 130 forms an aggregate 140. An aggregate 140 is a collection 138 of documents 142, 146 having a shared attribute 136 having non-unique values. Documents 138 can be aggregated by attributes 136 such as:

Category—a collection of documents 130 about a specific topic.
Community—a collection of documents 130 of interest to a given group of people.
Location—a collection of documents 130 authored by people in a geographic location (e.g. USA, Utah, Massachusetts, Europe).
Job function or role—a collection of documents 130 authored by people in particular job roles (e.g. Marketing, Development).
Group (where group is a list of people)—a collection of documents authored by a given set of people.
Any other attributed 136 shared by a group (and having non-unique values).

Aggregate Aging

In accordance with the preferred embodiment of the invention, a system and method is provided for examining the aging of an information aggregate, to help people locate interesting sources of information by looking at the creation dates of that information. When looking at a collection of information aggregates, the age identifies which aggregates are new (and therefore potentially interesting). When looking within an aggregate, the distribution of ages can reveal patterns of usage within an aggregate, including aggregates which are falling into disuse. Aggregates that have been in existence for a longer period are potentially more important; aggregates no longer used indicate a decrease in importance.

Figure 7:
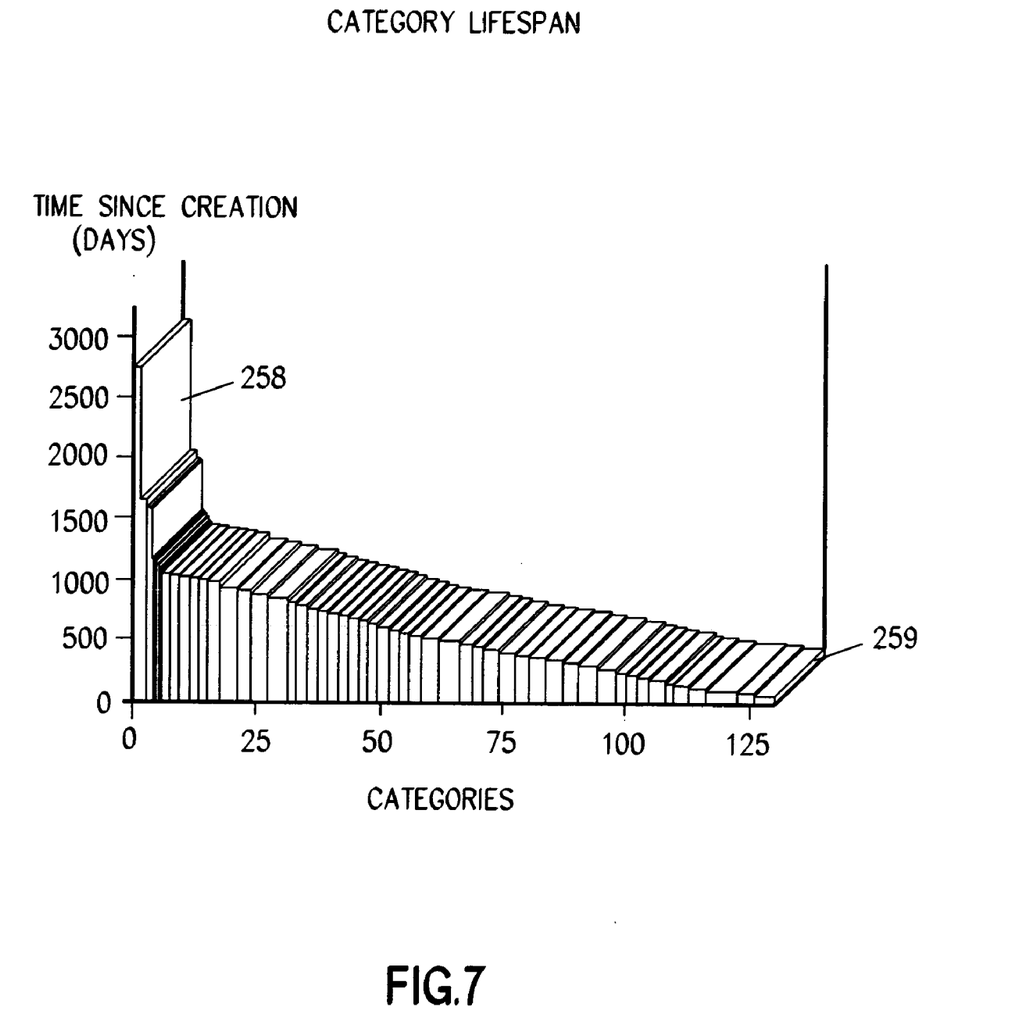
FIG. 7 is a bar chart visualizing the aging of a set of categories in accordance with the preferred embodiment of the invention.

The main advantage of the aging metric 258, 259 is that it can improve organizational effectiveness. If people can identify interesting and useful sources of information more quickly, then they can be more effective in getting their jobs done. Higher effectiveness translates into higher productivity.

Figure 8:
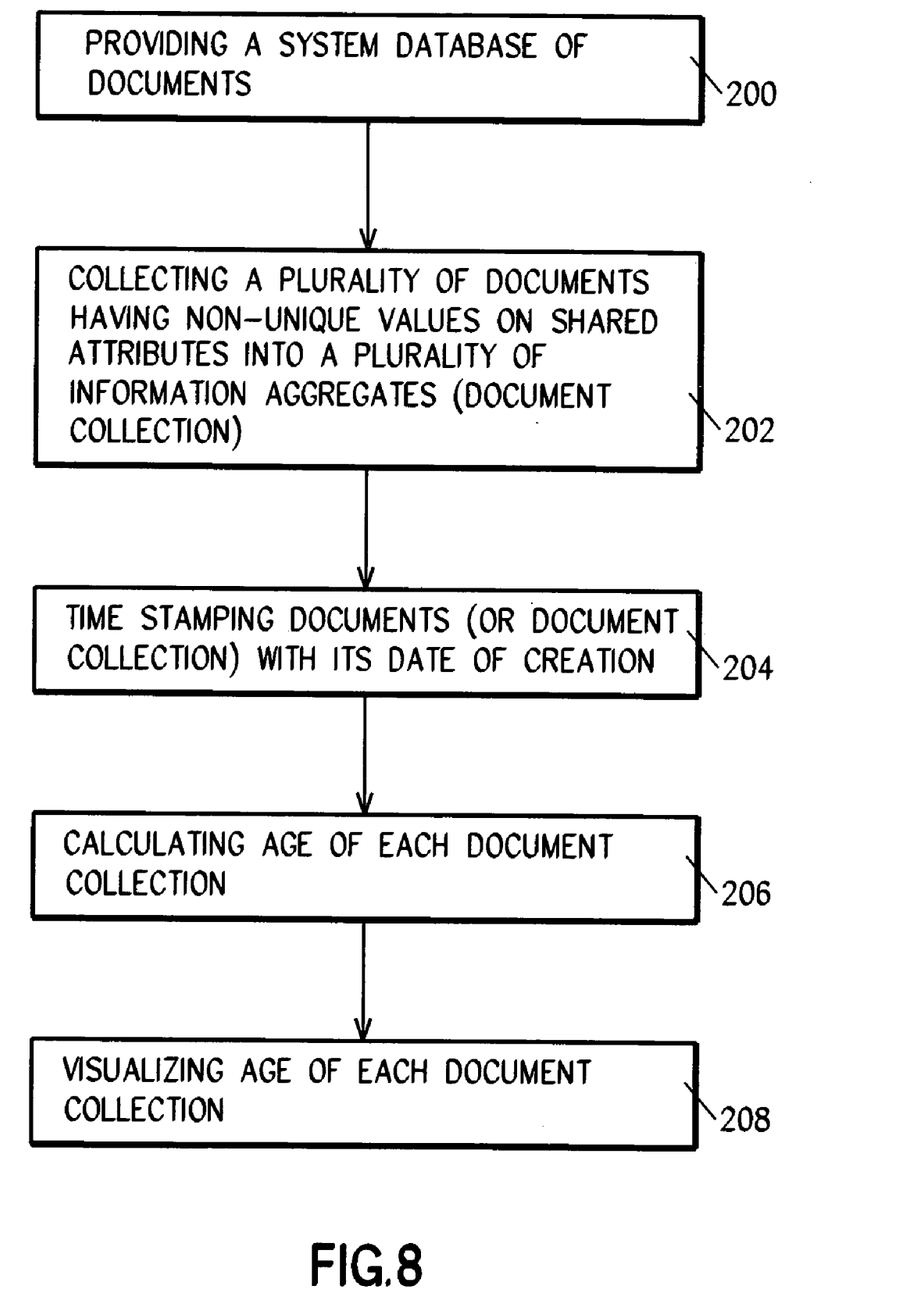
FIG. 8 is flow chart illustrating the steps of a preferred embodiment of the invention.

Referring to FIG. 8 in connection with FIGS. 2, 3, 6, and 7, a system and method for evaluating information aggregates 140 by, in step 200 providing a system database 31 of documents, in step 202 collecting a plurality of documents 142, 146 in database 31 having non-unique values on shared attributes "attribute=X" 136 into a plurality of information aggregates 140; instep 204 time stamping each document 142, 144, 146, with its date of creation 134; in step 206 calculating the age 258, 259 of each of a plurality of information aggregates 140; and in step 208 visualizing the ages 258, 259 of a plurality of information aggregates 140.

In accordance with the preferred embodiment of the invention, a system is provided that has the following characteristics:

The system contains (step 200) documents in documents database 31. (Examples of documents include Web pages, records in Notes databases, and e-mails).
Documents are collected (step 202) together into aggregates 140. One example of an aggregate 140 might be a category which could group together documents that are concerned with a particular topic X. p1 A creation date 134 is associated (step 204) with a document 142, 144, 146, and optionally, with the information aggregates 140 that contain the document. Some aggregates 140 are persistent and track the date of their creation. Other aggregates 140 might be transient, in which case the date of creation is calculated from the creation dates 134 of the documents 142, 146 comprising the aggregate 140.

For a particular information aggregate 140, its age is a measure of time elapsed (FIG. 7, y-axis) since the aggregate was created. To determine (step 206) the age 258, 259 of an aggregate 140, the creation date of the aggregate (Ca) is determined, for example, in one of two ways:

First, the creation date of the aggregate 140 is derived from the documents 142, 146 contained in the aggregate. In this case, the creation date of the aggregate 140 is the same as the creation date 132 of the oldest document 142 in the aggregate. One example of this is an aggregate that represents the results of a search. Here the age of the oldest document in the search results set is determined to be the age 258, 259 of the aggregate 140. This could be generalized to include any other algorithm applied to derive an aggregate 140 age from the age of its documents 142, 146 (average, median, etc.).

Second, the creation date (Ca) of the aggregate 140 may be set by meta-data stored in a record 32 that defines the aggregate. One example of this is a category as defined by the Lotus Discovery Server. Information about the category is stored in a database 30 (including the date on which the category was created).

The age of the aggregate (Aa) is calculated as the number of days since creation:

Aa=Dnow−Ca where Dnow is the current date.

A similar calculation can be performed against the documents contained in the aggregate.

Ad=Dnow−Cd where Ad is the age of the document and Cd the creation date of the document.

Gives these age calulations (step 206), the distribution of ages for collections of information aggergates, and for the documents within an information aggregate, may be visualized by bar charts FIG. 7, for example. From such visualizations, potentially interesting pieces of information may be determined. For example, documents or aggregates with low (FIG. 7, for example, categories at x-axis values 100–125) with low ages can be interesting because they are new, and therefore represent current activity. Documents or aggregates that are old (FIG. 7, for example, categories at x-axis values 0–4) can be interesting because they have withstood the test of time, and might therefore have lasting value, or they might represent information that is no longer relevant.

The shapes of the distribution graphs can be interesting, as well. For example, distributions that show a preponderance of old documents indicate that activity is dying out in a particular aggregate. Additionally, if the plots show a spike in recent activity, then that might indicate a surge in interest in a particular topic.

The age metric 258, 259 is different from collaborative filtering because it focuses visualization on collections of documents 140, rather than individual documents 142, 144, 146. Using a collection 140 to generate metrics can provide more context to people who are looking for information. Age also focuses on what happens in the time dimension, as opposed to traditional search engines which focus primarily on document content.

FIG. 7 is a bar chart showing the age for a set of categories, with the ages sorted and displayed from highest to lowest. The categories on the far left are those categories that are the oldest, while the categories on the far right are the youngest (most recently created).

Advantages Over the Prior Art

It is an advantage of the invention that there is provided an improved system and method for detecting and visualizing knowledge trends within a knowledge repository.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product including a computer readable storage or memory medium, such as a magnetic or optical, tape or disc, or the like, for storing program instructions readable by a computer, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries-, or the like and pursuant to one or more, or a part of one or more, program elements, modules or objects generated from any programming language, such as C++, Java, P1/Z, Fortran or the like.

Accordingly, the scope of protection of this invention is limited only by the following claims and their equivalents

We claim:

1. A computer implemented method for evaluating a plurality of document collections to identify and selectively reference those document collections representing current activity, those having lasting value, and those no longer relevant thus identifying trends in knowledge over time, identifying the social networks that form from users' interaction around a shared document collection, identifying those visualizations that allow inferences about how successfully an information resource system is adopted and utilized by users, and identifying those visualizations which could help or encourage a higher level of adoption of information resources, comprising:

collecting into computer storage a plurality of document collections, each document collection comprising a sub-grouping of documents in a document database having non-unique values on a shared textual attribute;

time stamping date of creation on said documents;

calculating, and at least temporarily fixing in said computer storage, age of each said document collection as a measure of time since creation of said documents comprising said sub-grouping, said age being determined for a given document collection from meta-data stored in a record that defines the document collection, said calculating comprising evaluation of the relationship Aa=Dnow−Ca, where Aa is said age of said document collection, Dnow is the current date, and Ca is the date of creation of said document collection from said meta-data;

visualizing said age for a plurality of said document collections; and responsive to said visualizing, identifying and examining selected document collections to identify and selectively reference those document collections representing current activity, those having lasting value, and those no longer relevant, thus to reveal and magnify hidden knowledge dynamics within an organization and encourage said higher level of adoption of said information resources.

2. The computer implemented method of claim 1, said age for a given document collection being calculated from ages of documents in said given document collection.

3. A computer implemented method for evaluating a plurality of document collections to identify and selectively reference those document collections representing current activity, those having lasting value, and those no longer relevant thus identifying trends in knowledge over time, identifying the social networks that form from users' interaction around a shared document collection, identifying those visualizations that allow inferences about how successfully the system is adopted and utilized by users, and identifying those visualizations which could help or encourage a higher level of adoption of information resources, comprising: collecting into computer storage a plurality of document collections, each document collection comprising a sub-grouping of documents in a document database having non-unique values on a shared textual attribute;

time stamping date of creation on said documents;

calculating, and at least temporarily fixing in said computer storage, age of each said document collection as a measure of time since creation of said documents comprising said sub-grouping said age for a given document collection being determined as the age of the oldest of any said document in said given document collection, said calculating comprising evaluation of the relationship Ad=Dnow−Cd, where Ad is age of the oldest document in said document collection, Dnow is the current date, and Cd is the date of creation of said oldest document;

visualizing said age Ad for a plurality of said document collections; and responsive to said visualizing, identifying and examining selected document collections to identify and selectively reference those document collections representing current activity, those having lasting value, and those no longer relevant, thus to reveal and magnify hidden knowledge dynamics within an organization and encourage said higher level of adoption of said information resources.

4. A computer system for evaluating a plurality of document collections to identify and selectively reference those document collections representing current activity, those having lasting value, and those no longer relevant thus identifying trends in knowledge over time, identifying the social networks that form from users' interaction around a shared document collection, identifying those visualizations that allow inferences about how successfully the system is adopted and utilized by users, and identifying those visualizations which could help or encourage a higher level of adoption of information resources, comprising:

a computer storage for storing documents in a documents database of a document management system;

a metrics database for storing in said computer storage, for each of a plurality of documents, document indicia including document attributes, associated persons and time of creation;

a computer implemented query engine responsive to a user request and said metrics database for forming and storinq in said computer storage a plurality of document collections, each document collection formed by selecting from said documents in said documents database a subset of documents having same, unique attributes;

said query engine further for calculating, and at least temporarily fixing in said computer storage, an age value of each said document collection as a measure of time from creation of documents in said document collection, said age being determined for a given document collection from meta-data stored in a record that defines said given document collection, with Aa=Dnow−Ca, where Aa is said age of said document collection, Dnow is the current date, and Ca is the date of creation of said document collection from said meta-data; and a computer implemented visualization engine for visualizing said age values for said plurality of document collections at a client display; said visualization engine further for identifying and examining document collections selected based on visualization of said age value to identify and selectively reference those document collections representing current activity, those having lasting value, and those no longer relevant, thus to reveal and magnify hidden knowledge dynamics within an organization and encourage said higher level of adoption of said information resources.

5. The system of claim 4, said age for a given document collection being calculated from ages of documents in said given document collection.

6. A computer system for evaluating a plurality of document collections to identify and selectively reference those document collections representing current activity, those having lasting value, and those no longer relevant thus identifying trends in knowledge over time, identifying the social networks that form from users' interaction around a shared document collection, identifying those visualizations that allow inferences about how successfully the system is adopted and utilized by users, and identifying those visualizations which could help or encourage a higher level of adoption of information resources, comprising:

a computer storage for storing documents in a documents database of a document management system;

a metrics database for storing in said computer storage, for each of a plurality of documents, document indicia including document attributes, associated persons and time of creation;

a computer implemented query engine responsive to a user reguest and said metrics database for forming and storing in said computer storage a plurality of document collections, each document collection formed by selecting from said documents in said documents database a subset of documents having same, unique attributes;

said query engine further for calculating, and at least temporarily fixing in said computer storage, an age value of each said document collection as a measure of time from creation of documents in said document collection said age for a given document collection being determined as the age of the oldest of any said document in said given document collection, where Ad=Dnow−Cd, where Ad is age of the oldest document in said document collection, Dnow is the current date, and Cd is the date of creation of said oldest document; and a computer implemented visualization engine for visualizing said age values for said plurality of document collections at a client display; said visualization engine further for identifying and examining document collections selected based on visualization of said age value to identify and selectively reference those document collections representing current activity, those having lasting value, and those no longer relevant, thus to reveal and magnify hidden knowledge dynamics within an organization and encourage said higher level of adoption of said information resources.

7. A program storage device readable by a computer, tangibly embodying a program of instructions executable by a computer for evaluating document collections to identify and selectively reference those document collections representing current activity, those having lasting value, and those no longer relevant thus identifying trends in knowledge over time, identifying the social networks that form from users' interaction around a shared document collection, identifying those visualizations that allow inferences about how successfully the system is adopted and utilized by users, and identifying those visualizations which could help or encourage a higher level of adoption of information resources, said program of instructions comprising:

instructions for collecting into a document collection, from a documents database including a plurality of documents, a subset of documents having non-unique values on a shared textual attribute;

instructions for time stamping date of creation on said documents;

instructions for calculating, and at least temporarily fixing in computer storage, age of said document collection, said age for said document collection being selectively calculated as the age of the oldest of any said document in said given document collection such that $Ad=Dnow-Cd$, where Ad is age of the oldest document in said document collection, Dnow is the current date, and Cd is the date of creation of said oldest document, and from meta data defining the date of creation of said given document collection such that $Aa=Dnow-Ca$, where Aa is said age of said document collection, Dnow is the current date, and Ca is the date of creation of said document collection as obtained from said meta-data;

instructions for visualizing said age for a plurality of said document collections to identify those documents collections of current and growing interest; and instructions for identifying and examining a document collection selected based on visualization of said age as a document collection of current and growing interest to identify and selectively reference those document collections representing current activity, those having lasting value, and those no longer relevant, thus to reveal and magnify hidden knowledge dynamics within an organization and encourage said higher level of adoption of said information resources.

8. A computer program product stored on a tangible computer storage device for evaluating document collections to identify and selectively reference those document collections representing current activity, those having lasting value, and those no longer relevant thus identifying trends in knowledge over time, identifying the social networks that form from users' interaction around a shared document collection, identifying those visualizations that allow inferences about how successfully the system is adopted and utilized by users, and identifying those visualizations which could help or encourage a higher level of adoption of information resources, according to the method comprising collecting from a document database a plurality of documents having non-unique values on a shared textual attribute into a document collection including a subset of said plurality of documents;

time stamping date of creation on said documents;

calculating, and at least temporarily fixing in computer storage, age of said document collection, said age for said document collection being selectively calculated as the age of the oldest of any said document in said given document collection such that $Ad=Dnow-Cd$, where Ad is age of the oldest document in said document collection, Dnow is the current date, and Cd is the date of creation of said oldest document, and from meta data defining the date of creation of said given document collection such that $Aa=Dnow-Ca$, where Aa is said age of said document collection, Dnow is the current date, and Ca is the date of creation of said document collection as obtained from said meta-data;

visualizing said age for a plurality of said information document collection to identify whether said document collection is one of current and growing interest; and examining specific document collections selected based on said age for current information to identify and selectively reference those document collections representing current activity, those having lasting value, and those no longer relevant, thus to reveal and magnify hidden knowledge dynamics within an organization and encourage said higher level of adoption of said information resources.

9. A computer implemented method for evaluating document collections to identify and selectively reference those document collections representing current activity, those having lasting value, and those no longer relevant thus identifying trends in knowledge over time, identifying the social networks that form from users' interaction around a shared document collection, identifying those visualizations that allow inferences about how successfully the system is adopted and utilized by users, and identifying those visualizations which could help or encourage a higher level of adoption of information resources, comprising:

collecting a plurality of documents having non-unique values on a shared textual attribute into a document collection formed as a subset of a document database;

time stamping date of creation on said documents;

calculating, and at least temporarily fixing in computer storage, age of said document collection, said age for said document collection being selectively calculated as the age of the oldest of any said document in said given document collection such that $Ad=Dnow-Cd$, where Ad is age of the oldest document in said document collection, Dnow is the current date, and Cd is the date of creation of said oldest document, and from meta data defining the date of creation of said given document collection such that $Aa=Dnow-Ca$, where Aa is said age of said document collection, Dnow is the current date, and Ca is the date of creation of said document collection as obtained from said meta-data;

visualizing said ages of said documents for said plurality of said document collections; and identifying and examining those document collections determined based on said ages for information of current and growing interest to identify and selectively reference those document collections representing current activity, those having lasting value, and those no longer relevant, thus to reveal and magnify hidden knowledge dynamics within an organization and encourage said higher level of adoption of said information resources.

* * * * *